United States Patent [19]

Boutmy

[11] Patent Number: 4,616,256
[45] Date of Patent: Oct. 7, 1986

[54] TELEVISION CHANNEL DISTRIBUTION NETWORK

[75] Inventor: Patrick E. Boutmy, Paris, France

[73] Assignee: Societe Anonyme de Telecommunications, Paris, France

[21] Appl. No.: 586,860

[22] Filed: Mar. 6, 1984

[30] Foreign Application Priority Data

Mar. 23, 1983 [FR] France ............................ 83 04752

[51] Int. Cl.$^4$ .............................................. H04N 7/10
[52] U.S. Cl. ........................................... 358/86; 455/4
[58] Field of Search ................... 358/84, 86; 455/2, 4, 455/5

[56] References Cited

U.S. PATENT DOCUMENTS

| 4,025,947 | 5/1977 | Michael | 358/86 |
| 4,386,365 | 5/1983 | Gargini | 455/5 X |
| 4,395,780 | 7/1983 | Gohm et al. | 455/5 X |
| 4,484,218 | 11/1984 | Boland et al. | 358/86 |

FOREIGN PATENT DOCUMENTS

| 55-44206 | 3/1980 | Japan | 358/86 |
| 82/02639 | 8/1982 | PCT Int'l Appl. | 358/86 |

OTHER PUBLICATIONS

W. K. Ritchie, "Multi-Service Cable-Television Distribution Systems," *British Telecommunications Engineering*, vol. 1, Jan. 1983, pp. 205-210.

Clifford B. Schrock, "Proposal for a Hub Controlled Cable Television System Using Optical Fiber," *IEEE Transactions on Cable Television*, vol. CATV-4, No. 2, Apr. 1979, pp. 70-77.

"Transmission de Signaux de Television Codes sur Paire Coaxial pour Systemes Numeriques a Grande Vitesse", published in Onde Electrique, vol. 51, Feb. 1971, Paris, by P. Fritz, P. Boutmy and G. Le Fort.

"An Optical 1-Bits Video Link", published in European Conference on Optical Communications, 1981, Copenhague, pp. 14.4-1 to 14.4-4, by E. Roza.

*Primary Examiner*—Keith E. George
*Attorney, Agent, or Firm*—Lowe, Price, LeBlanc, Becker & Shur

[57] ABSTRACT

A subscriber television set terminal is linked to a distribution station receiving M television channels in a videocommunication network. The distribution station comprises as many individual channel selectors as there are television channels. A television channel is selected from a terminal by a digital video switching matrix that, for each channel address transmitted in a backward line of a terminal connecting line, connects the addressed channel selector to a forward line in the connecting line.

6 Claims, 3 Drawing Figures

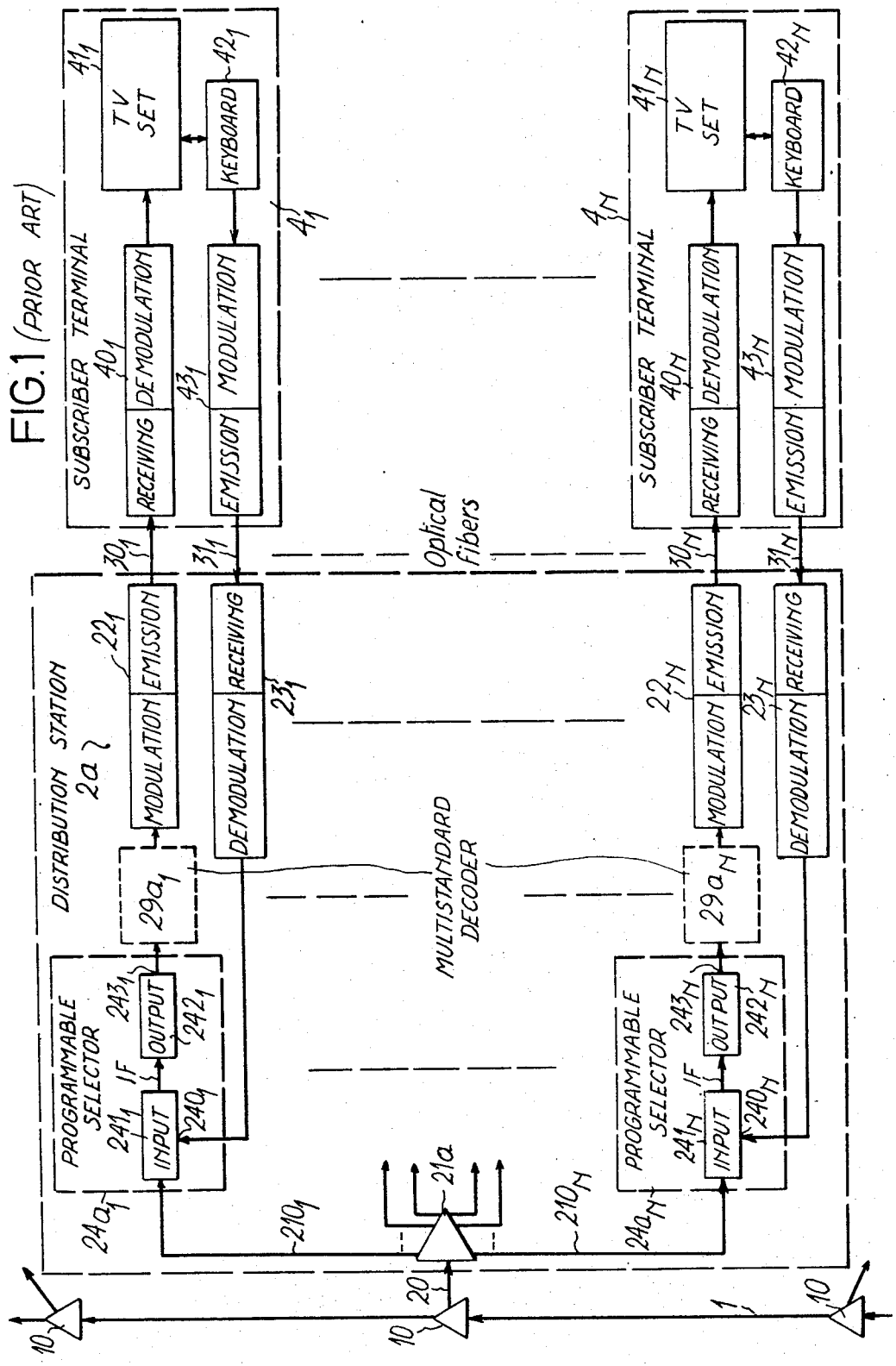

TELEVISION CHANNEL DISTRIBUTION NETWORK

BACKGROUND OF THE INVENTION

1. Field of the Invention

This invention deals with videocommunications and more particularly with the remote distribution of television channels to subscriber television terminals through a videocommunication cable network.

More precisely, the invention concerns a videocommunication network comprising at least one distribution station serving N subscriber television terminals. The distribution station includes a distribution amplifier for receiving M television channels from a wideband distribution line, and individual channel selectors each receiving the television channels repeated by the distribution amplifier. Each of the subscriber television terminals is connected to the distribution station via a bidirectional wideband transmission medium including a forward line carrying one of the television channels and a backward line carrying a channel address signal.

2. Description of the Prior Art

In known videocommunication networks of this type, an individual television channel selector is ascribed to each subscriber. The number, M, of television channels is decidely smaller than the number, N, of subscriber terminals. In a distribution station that comprises only analog transmission circuitry, each selector is interconnected between one of N distribution amplifier outputs and an input of the forward line of the corresponding transmission medium serving the subscriber terminal.

Selection of one television channel that the subscriber wishes to receive on the TV set is remotely controlled by an address signal carried by the corresponding backward line.

As a result, each selector is programmable remotely so as to retransmit only a desired channel from all the channels delivered by the distribution amplifier. The cost of linking a subscriber terminal to the distribution station is dependent primarily on the cost of the programmable channel selector, which is relatively high.

OBJECTS OF THE INVENTION

The main object of this invention is to reduce considerably the number of individual television channel selectors in a distribution station of a videocommunication network.

Another object of this invention is to cut the cost of linking a subscriber terminal to a distribution station of a videocommunication network and, consequently, the maintenance of the network.

SUMMARY OF THE INVENTION

In accordance with these objects, there is provided a videocommunication network comprising a distribution station for receiving M television channels from a wideband distribution line, and N subscriber television terminals each connected to the distribution station via a bidirectional wideband transmission medium. A transmission medium includes a first line for carrying one of the television channels from the station to the terminal and a second line carrying a channel address signal from the terminal to the station. The distribution station comprises selectors for reciving all of the M television channels; each selector continuously selects a respective television channel. The number of individual channel selectors is equal to the number M of the television channels. The distribution station also comprises M video coding means for respectively converting the channels selected by the selectors into M digital signals, digital video switching means and N video decoding means. The switching means is controlled by the channel address signals in N second lines and comprises M inputs respectively receiving the M digital signals from video coding means and N outputs selectively linked with the N video decoding means. The switching means selectively connects each of the N outputs to one of the M inputs, the input being addressed by the channel address signal in a second line of a transmission medium including the first line associated with the output. The video decoding means converts the digital signals respectively delivered by the switching means outputs into the corresponding television channels carried by the N first lines.

The network embodying the invention has a hybrid structure including analog and digital circuits. The video switching means are composed of an assembly of video switching sub-matrices that are digital in order to avoid, in particular, any cross-talk problems between the various lines to be switched.

According to another aspect of the invention, plural assemblies, each comprising a channel selector and a video coding means associated with a television channel are relieved such that the subscriber terminals can all receive the video channels, even if one of the selectors and/or one of the video coding means is faulty or inoperative. In this case, the distribution station comprises a programmable spare selector for receiving the M television channels from the distribution line, spare video coding means for converting a video channel selected by the spare selector into a digital signal, and means for selectively substituting the spare selector and the spare video coding means for a faulty assembly comprising one of the M selectors and one of the M video coding means associated with one of the television channels.

BRIEF DESCRIPTION OF THE DRAWING

Other features and advantages of this invention will be more clearly apparent from the following more particular description of preferred embodiments in reference to the corresponding accompanying drawings in which:

FIG. 1 is a block-diagram of a prior art videocommunication cable network; and

DESCRIPTION OF THE PREFERRED EMBODIMENTS

Figure 2A:
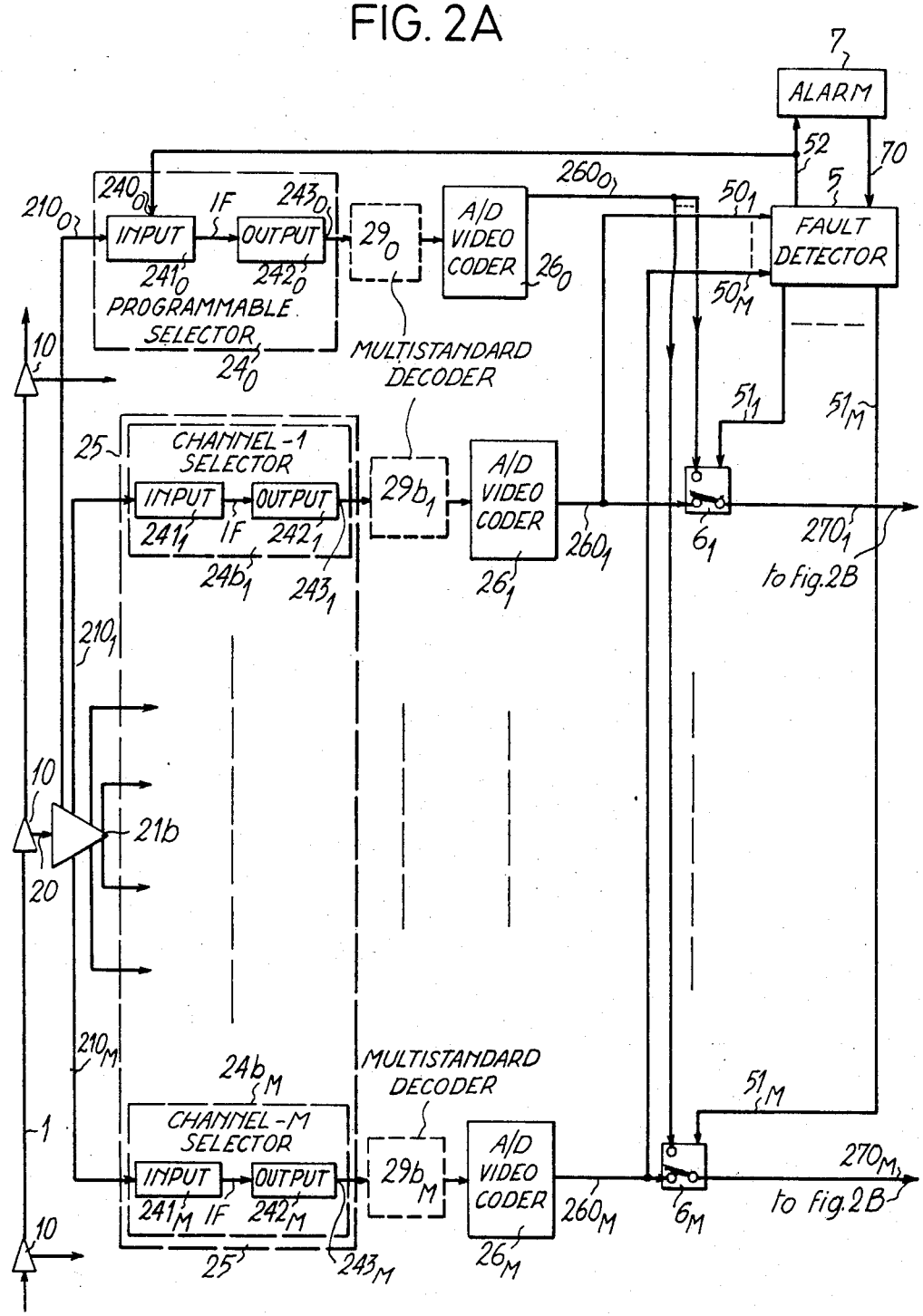
FIGS. 2A and 2B, together, are a block diagram of a videocommunication cable network embodying the invention.

For a clearer view of the advantages of this invention, a brief review is provided of a prior art videocommunication cable network with reference to FIG. 1.

The prior art network comprises a wideband transfer line 1 that carries television channels delivered by a head-station. It is assumed hereinafter that the network is of the I type and is designed to serve a large number N of subscriber color television terminals, e.g. 1000, and that the network capacity regarding the number M of programs is also very large, typically thirty individual television channels. As transfer line 1 is long and the number of television channels high, use must be made of metric waves to transmit the television channels. A total frequency bandwidth encompassing all the television channels ranges, for example, from 100 to 450 MHz; a bandwidth of 10 MHz is ascribed to each of the M channels.

Transfer line 1 interconnects branching amplifiers 10 that are spaced every 0.5 to 1 km. Each branching amplifier 10 amplifies the analog television signals intended for a respective branch in the form of wideband line referred to as a distribution line 20. In a distribution station 2a, a respective distribution line 20 feeds one or more distribution amplifiers 21a that amplify and distribute all the M television channels to N bidirectional wideband subscriber connecting lines $30_1$-$31_1$ to $30_N$-$31_N$.

The prior art videocommunication network is fully analog. Generally, transfer line 1 and distribution lines, such as line 20, are made up of coaxial cables. Connecting lines $30_1$-$31_1$ to $30_N$-$31_N$ each consist of a forward line $30_1$ to $30_N$ and a backward line $31_1$-$31_N$ in the form of two optical fibers. As the connecting lines, together with end circuits connected to ends of the connecting lines, are respectively identical, a detailed description is only given of the end circuits linked to the connecting line $30_1$-$31_1$.

Connecting line $30_1$-$31_1$, inside the subscriber facilities, is linked to a subscriber television terminal $4_1$. In terminal $4_1$, a conventional optical receiving and demodulating circuit $40_1$ receives the video signal of a selected channel propagating on forward line $30_1$ and retransmits the video signal in baseband to a service socket otherwise known as a peritelevision socket of a television set $41_1$. Terminal $4_1$ further comprises a keyboard $42_1$ having an output for delivering signalling information signals, such as a digital channel address signal, to backward line $31_1$ through a conventional modulating and optical emitting circuit $43_1$. By means of keyboard $42_1$, the subscriber can select a television channel, the address of which is transmitted to distribution station 2a over backward line $31_1$. The video signal of the selected channel is retransmitted over forward line $30_1$ for the purpose of displaying a corresponding television program on a screen of TV set $41_1$.

In distribution station 2a, another end of subscriber connecting line $30_1$-$31_1$ is equipped with a modulating and optical emitting circuit $22_1$ having an output connected to forward line $30_1$; line $30_1$-$31_1$ also includes an optical receiving and demodulating circuit $23_1$ having an input connected to backward line $31_1$.

In prior art distribution station 2a, attributed to each connecting line $30_1$-$31_1$ to $30_N$-$31_N$, is an individual programmable channel selector $24a_1$ to $24a_N$. Each selector $24a_1$ to $24a_N$ receives all the M television channels delivered by one of N wideband outputs $210_1$ to $210_N$ from distribution amplifier 21a.

Each channel selector, such as selector $24a_1$, has two functions.

A first function of selector $24a_1$ consists of selecting one of the M television channels that the subscriber remotely addresses using keyboard $42_1$. An address signal is fed into a control input $240_1$ of selector $24a_1$, connected to an output of circuit $23_1$ in backward line $31_1$. Selection of the frequency of the desired channel is performed in wideband input stages $241_1$ of selector $24_1$ that comprises a voltage controlled oscillator in a phase locked loop. The phase locked loop includes frequency divider having a frequency programmable in terms of the address signal fed to input $240_1$. An output from input stages $241_1$ delivers the selected television channel at a predetermined intermediate frequency, IF, typically on the order of 35 MHz. The intermediate frequency is the same at the outputs of all input stages $241_1$ to $241_N$ in selectors $24a_1$ to $24a_N$, regardless of the respective channels selected by the subscribers.

The second function of selector $24_1$ is to transpose the intermediate frequency IF into the actual baseband of the video signal. The frequency transposition is carried out in output stages $242_1$ of selector $24_1$ that further comprises a phase locked loop controlling a quartz-stabilized, voltage controlled oscillator. Output $243_1$ from output stages $242_1$ delivers the baseband video signal of the selected television channel to an input of modulating and optical emitting circuit $22_1$ ascribed to forward line $30_1$.

As already stated, the major drawback of the prior art videocommunication cable network depicted in FIG. 1 lies in the high number of channel selectors $24a_1$ to $24a_N$ that is equal to the number of subscribers, N=1000. Because a selector is ascribed to each subscriber terminal to be connected there is a considerable rise in the linking cost per subscriber.

Figure 2B:
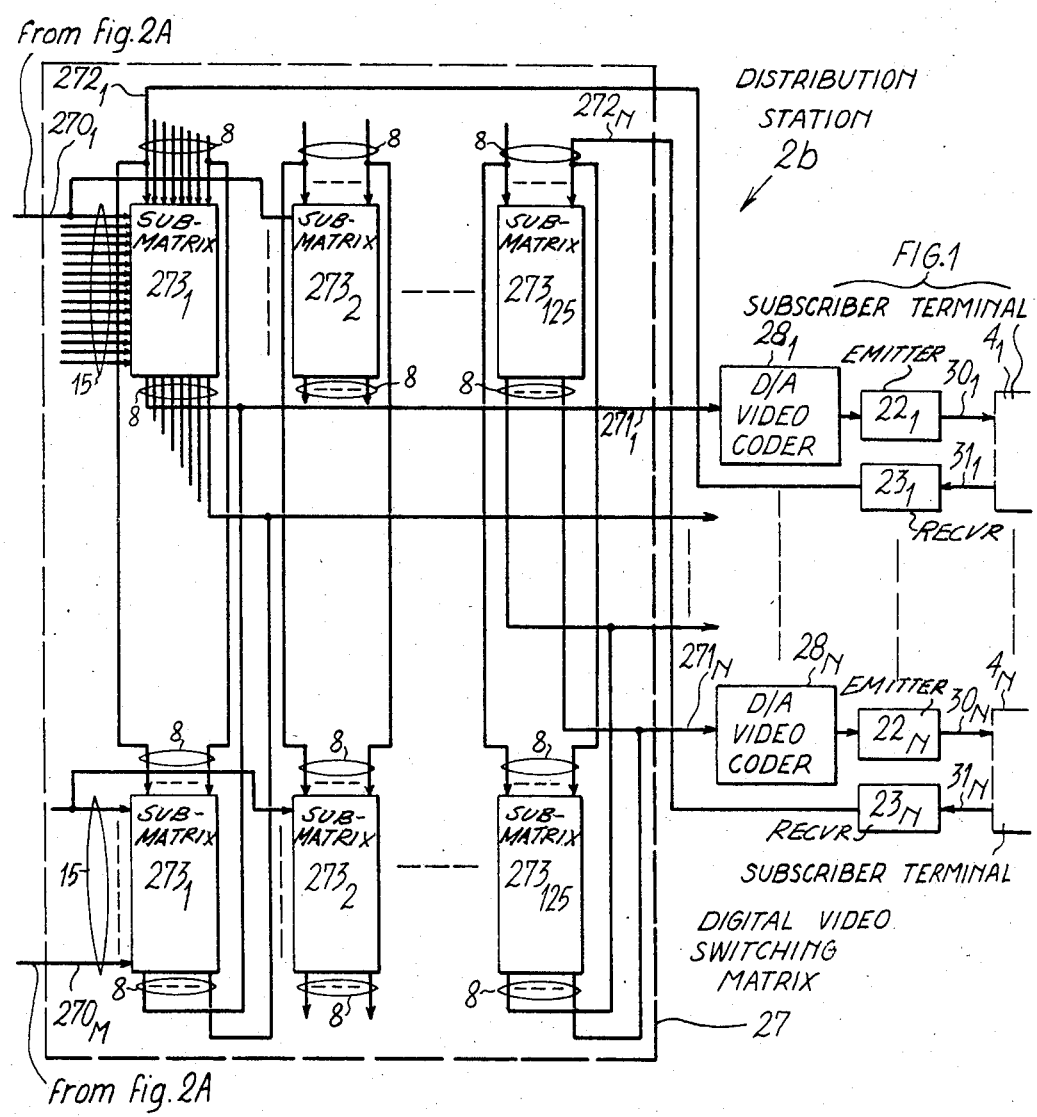

A videocommunication cable network embodying the invention is now described in reference to FIGS. 2A and 2B. As for the prior art network depicted in FIG. 1, the network embodying the invention comprises a wideband transfer line 1 with branching amplifiers 10, and distribution stations; only one of the distribution stations, namely station 2b, is shown in detail in FIGS. 2A and 2B. Distribution station 2b is totally different from distribution station 2a described above. Station 2b serves subscriber terminals $4_1$ to $4_N$ by means of N bidirectional wideband subscriber connecting lines $30_1$-$31_1$ to $30_N$-$31_N$. Each connecting line, as in reference to FIG. 1, is made up of a forward optical line $30_1$ to $30_N$ and a backward optical line $31_1$ to $31_N$. Each forward and backward line ending in distribution station 2b is respectively provided with a modulating and optical emitting circuit $22_1$ to $22_N$ and an optical receiving and demodulating circuit $23_1$ to $23_N$. Other forward and backward lines ending in subscriber terminals $4_1$ to $4_N$ are respectively provided with optical receiving and demodulating circuits $40_1$ to $40_N$ and modulating and optical emitting circuits $43_1$ to $43_N$.

Distribution station 2b comprises a wideband distribution amplifier 21b that receives all the M television channels from distribution line 20. Amplifier 21b amplifies and repeats all the M channels over M inputs $210_1$ to $210_M$ of a channel separating and filtering circuit 25. For each of inputs $210_1$ to $210_M$, circuit 25 includes separate respective channel selectors $24b_1$ to $24b_M$. Each selector $24b_1$ to $24b_M$ is substantially analogous to selector $24a_1$ to $24a_N$ described in reference to FIG. 1, but includes input stages $241_1$ to $241_M$ continuously tuned to the frequency of the respective channel. Selectors $24b_1$ to $24b_M$ are therefore not programmable, but are more straightforward and less expensive than selectors $24a_1$ to $24a_N$.

Outputs $243_1$ to $243_M$ from selectors $24b_1$ to $24b_M$ respectively deliver the M base band television channels to analog-to-digital video coders $26_1$ to $26_M$. Each analog-to-digital video coder converts the television signal of the respective channel into a 140 Mbit/s digital signal. Use is preferably made of a known delta-sigma ($\Delta\Sigma$) type differential modulation coder for coders $26_1$ to $26_M$. A digital signal derived by the coder is a pulse train proportional in density to the instantaneous value of the television signal amplitude. Such a coder is disclosed in the article by P. FRITZ, P. BOUTMY and G.

LE FORT entitled "Transmission de signaux de télévision codés sur paire coaxiale pour systèmes numériques à grande vitesse" published in Onde Electrique, Vol. 51, February 1971, Paris, and in the article by E. ROZA entitled "AN OPTICAL 1-BITS VIDEO LINK" published in European Conference on Optical Communications, 1981, Copenhague, pages 14.4-1 to 14.4-4.

The M digital television signals derived from coders $26_1$ to $26_M$ are fed to M inputs $270_1$ to $270_M$ of a digital video switching matrix 27 respectively. As depicted in FIG. 2B, matrix 27 has N outputs $271_1$ to $271_N$ connected to inputs of digital-to-analog video decoders $28_1$ to $28_N$ respectively. N control inputs $272_1$ to $272_N$ of matrix 27 receive the channel address signals delivered by the outputs from optical receiving and demodulating circuits $23_1$ to $23_N$ respectively. In response to the channel address typed out on keyboards $42_1$ to $42_N$ and transmitted in respective backward line $31_1$ to $31_N$, matrix 27 selects the addressed television channel at one of the M inputs $270_1$ to $270_M$ and connects the selected input to the respective output $271_1$ to $271_N$ that is linked, via a respective decoder $28_1$ to $28_N$ and a respective circuit $22_1$ to $22_N$, to the forward line $30_1$ to $30_N$ of the connecting line including said backward line $31_1$ to $31_N$. Decoders $28_1$ to $28_N$ convert the digital television signals supplied by outputs $271_1$ to $271_N$ of matrix 27 into baseband analog television signals. Each decoder consists solely of a low pass filter when coder $26_1$ to $26_M$ is of the delta-sigma type.

In practice, digital video switching matrix 27 is made up of several commercially available switching sub-matrices $273_k$, each having sixteen inputs and eight outputs, such as Radiotechnique Compelec (R.T.C.) circuit types HXA 231101. When M is equal to 30 and N is equal to 1000, switching matrix 27 comprises two assemblies each consisting of 125 sub-matrices $273_1$ to $273_{125}$. Fifteen inputs of each of the sub-matrices in a first assembly are respectively connected to fifteen inputs, such as inputs $270_1$ to $270_{15}$, and fifteen inputs of each of the sub-matrices in a second assembly are respectively connected to the other fifteen inputs of matrix 27, such as inputs $270_{16}$ to $270_{30}$. Sixteen outputs from each pair of sub-matrices in both assemblies are connected two-by-two to eight respective outputs from matrix 27. By way of an example, eight outputs from each of first two sub-matrices $273_1$ are respectively connected to outputs $271_1$ to $271_8$, and eight outputs from each of the last two sub-matrices $271_{125}$ are respectively connected to outputs $271_{993}$ to $271_{1000}$, as illustrated in FIG. 2B. Still within the scope of this example, eight control inputs of each of the first two sub-matrices $273_1$ are respectively connected to control inputs $272_1$ to $272_8$ of matrix 27, and eight control inputs of each of the last two sub-matrices $273_{125}$ are respectively connected to control inputs $272_{993}$ to $272_{1000}$ of matrix 27.

Thus, according to the invention, each subscriber does not select an analog television signal from among M in an individual subscriber selector but rather selects a corresponding digital television signal from among M in a digital video switching matrix accessible to all the subscribers.

By way of comparison against the prior art network in FIG. 1, the network embodying the invention employs M unprogrammable selectors $24b_1$ to $24b_M$ instead of N programmable selectors $24a_1$ to $24a_N$. For M=30 and N=1000, the reduction in the number of selectors as in the invention is reflected by a decrease in cost of 1000/30, i.e. 97%. Taking into consideration the relatively low cost of coders $26_1$ to $26_M$, decoders $28_1$ to $28_N$ and the 125 pairs of switching sub-matrices $273_1$ to $273_{125}$, the invention brings about a saving in overall cost of some 50% or so. Additionally, the volume of all the elements contained in distribution station 2b embodying the invention is practically equal to 30% of that of prior art distribution station 2a. Further, as the number of selectors $24b_1$ to $24b_M$ is small, the overall maintenance of the videocommunication network is alleviated. The manufacture of each selector can be optimized since each selector $24b_1$ to $24b_M$ is ascribed to a predetermined television channel.

Distribution station 2b affords a further advantage cost-wise when the station is inserted into a videocommunication network distributing television channels in accordance with a television standard other than that of television sets $41_1$ to $41_N$. The compatability between television standards is achieved by respectively inserting M multistandard television decoders $29b_1$ to $29b_N$ between outputs $243_1$ to $243_M$ of channel selectors $24b_1$ to $24b_M$ and the inputs of video coders $26_1$ to $26_M$. In accordance with the prior art shown in FIG. 1, N multistandard television decoders $29a_1$ to $29a_N$ must be respectively inserted between the outputs of selectors $24a_1$ to $24a_N$ and the inputs of modulating and optical emitting circuits $22_1$ to $22_N$.

Preferably, distribution station 2b comprises redundant means for relieving, when necessary, the multiple input assemblies, each including a channel selector $24b_1$ to $24b_M$ and an analog-to-digital video coder $26_1$ to $26_M$ in order to replace a defective input assembly by a spare assembly including a programmable channel selector $24_0$ and an analog-to-digital video coder $26_0$.

As depicted in FIG. 2A, outputs $260_1$ to $260_M$ from coder $26_1$ to $26_M$ are respectively connected to inputs $50_1$ to $50_M$ of a fault detector 5 and are also connected normally to inputs $270_1$ to $270_M$ of switching matrix 27 via switching circuits $6_1$ to $6_M$. Changes of state in switching circuits $6_1$ to $6_M$ are controlled by fault detector 5 via control leads $51_1$ to $51_M$ respectively. Faults detected by detector 5 in the digital signals at outputs $260_1$ to $260_M$ may have a rate loss in the digital signals, a digital signal error rate outside a predetermined range, loss of video line synchronization, and absence of the digital signal following malfunction in a member included in a selector or coder, or a supply failure to a selector or coder.

If detector 5 detects one of the above faults, detector 5 transmits an alarm and channel address signal to an alarm device 7 and to a control input $240_0$ of programmable spare selector $24_0$, via a link 52. Alarm device 7 comprises, in a known manner, audio and/or visual alarm means to warn an operator in distribution station 2b that one of selectors $24b_1$ to $24b_M$ and/or one of coders $26_1$ to $26_M$ is inoperative. Preferably, alarm device 7 displays the channel number 1 to M corresponding to the faulty circuit, where link 52 carries the address of the corresponding channel.

Programmable selector $24_0$ is analogous to any one of programmable selectors $24a_1$ to $24a_N$ already described with reference to FIG. 1. Input $210_0$ of input stages $241_0$ in selector $24_0$ receives all the M television channels from distribution amplifier 21b. Input stages $241_0$ select a television channel corresponding to the address signal transmitted in link 52 such that output $243_0$ from output stages $242_0$ in selector $24_0$ transmits the baseband video signal to coder $26_0$ that selector $24b_1$ to $24b_M$ in the faulty assembly normally transmits. A multistandard decoder $29_O$ can be provided between the output from selector $24_O$ and the input into coder $26_O$.

Simultaneously with transmission of an address signal in link 52, fault detector 5 controls switching circuits $6_1$ to $6_M$ connected to the output of coder $26_1$ to $26_M$ included in the faulty assembly so the particular switching circuit $6_1$ to $6_M$ connects output $260_O$ of spare coder $26_O$ to the corresponding input $270_1$ to $270_M$ of switching matrix 27. Spare assembly $24_O$-$26_O$ thus replaces faulty assembly $24b_1$-$26_1$ to $24b_M$-$26_M$. Under these conditions, no subscriber is prevented from receiving the channel 1 to M normally selected by the faulty assembly. Once the faulty assembly has been repaired, the operator inhibits the link from a spare assembly $24_O$-$26_O$ to switching matrix 27 via a control link 70 between alarm device 7 and fault detector 5; the corresponding switching circuit $6_1$ to $6_M$ again connects the output $260_1$ to $260_M$ of the repaired assembly to the respective input $270_1$ to $270_M$ of matrix 27.

Although reference has been made in the foregoing description to video signals, the term "video" must be construed in the widest of meanings. In other words, the videocommunication network is used for the remote distribution of visual signals each comprising a composite video signal and a sound signal, or for the separate remote distribution of a composite video signal, or a sound signal such as a frequency modulated high fidelity audio signal.

Forward lines $30_1$ to $30_N$ and backward lines $31_1$ to $31_N$ can also carry other signals intended for other types of subscriber terminals, and in particular terminals related to the field of interactive telematics and bidirectional service signals transmission, such as teletex and videotex services.

What I claim is:

1. A distribution station for a videocommunication network, the station receiving M television channels 1 . . . h . . . M from a single wideband distribution line and routing the M channels to N subscriber television terminals 1 . . . k . . . N, where M and N are integers, k is selectively each of 1 through N, and h is selectively each of 1 through M, terminal k being connected to said distribution station via a bidirectional wideband transmission medium including a first line carrying one of said television channels from said station to terminal k and a second line carrying a channel address signal from terminal k to said station, said distribution station comprising 1 . . . h . . . M individual channel selectors, each of said selectors receiving said M television channels and continuously selecting a respective television channel, 1 . . . h . . . M video coding means for respectively converting the channels selected by said 1 . . . h . . . M selectors into 1 . . . h . . . M digital signals, digital video switching means controlled by said channel address signals in said N second lines, said switching means including 1 . . . h . . . M inputs respectively responsive to said 1 . . . h . . . M digital signals and 1 . . . k . . . N outputs respectively associated with said 1 . . . k . . . N television terminals in response to a respective digital channel address signal carried by the 1 . . . h . . . M inputs, input h being addressed by the digital channel address signal in said second line of the transmission medium including said first line associated with said output, and N video decoding means connected to said switching means outputs and to supply signals to said N first lines for converting the digital signals delivered by said switching means outputs into the corresponding television channels carried by said N first lines, said distribution station comprising a programmable spare selector for receiving said M television channels from said distribution line, spare video coding means for converting a television channel selected by said spare selector into a digital signal, and means for selectively substituting said spare selector and said spare video coding means for a faulty assembly comprising one of said M selectors and one of said M video coding means associated with one of said television channels.

2. The videocommunication network as claimed in claim 1 wherein said switching means comprises multiple digital video switching sub-matrices, said sub-matrices being arranged in a matrix of columns and rows such that sub-matrices in like rows are responsive to the same selected digital signals and the sub-matrices in like columns are responsive to the same channel address signals.

3. The videocommunication network as claimed in claim 1 wherein said video coding means are differential modulation coders and said video decoding means are differential demodulation decoders.

4. The videocommunication network as claimed in claim 3 wherein differential modulations and demodulations in said coders and decoders are of delta-sigma type.

5. The videocommunication network as claimed in claim 1 wherein said substituting means comprises means for detecting faults in said M digital signals as derived from said M video coding means, and 1 . . . h . . . M switching circuits, circuit h selectively linking one of said M video coding means and said spare video coding means to one of said inputs of said digital video switching means, detection of a fault in one of said M digital signals causing a selection of the respective video channel in said programmable spare selector and a link-up of said spare video coding means to the respective input of said digital video switching means via the respective switching circuit under the control of said fault detecting means.

6. The videocommunication network as claimed in claim 1, wherein said distribution station comprises multistandard video decoders respectively interconnected between said selectors and said video coding means.

* * * * *